United States Patent
Haueter et al.

(10) Patent No.: US 8,257,454 B1
(45) Date of Patent: Sep. 4, 2012

(54) METHOD FOR GASIFICATION OF CARBONACEOUS SOLID MATERIALS

(75) Inventors: Philipp Haueter, Aarau (CH); Andreas Z'Graggen, Zurich (CH); Dominic Trommer, Zurich (CH); Aldo Steinfeld, Brugg (CH); Manuel Romero, Madrid (ES); Juan Carlos De Jesus, Edo (VE); Domingo Rodriguez, Miranda (VE); Alfredo Morales, Caracas (VE); Julian Blanco, Tabernas (ES)

(73) Assignee: Intevep, S.A., Caracas (VE)

( * ) Notice: Subject to any disclaimer, the term of this patent is extended or adjusted under 35 U.S.C. 154(b) by 1262 days.

(21) Appl. No.: 12/017,426

(22) Filed: Jan. 22, 2008

Related U.S. Application Data

(60) Division of application No. 11/369,517, filed on Mar. 6, 2006, now Pat. No. 7,449,158, which is a continuation-in-part of application No. 10/954,507, filed on Sep. 29, 2004, now Pat. No. 7,176,246.

(60) Provisional application No. 60/508,064, filed on Oct. 1, 2003, provisional application No. 60/659,807, filed on Mar. 8, 2005.

(51) Int. Cl.
*C10J 3/00* (2006.01)

(52) U.S. Cl. ............... 48/210; 48/200; 48/202; 423/650

(58) Field of Classification Search ............. 48/210, 48/197 R, 200, 202; 423/650; 431/2
See application file for complete search history.

(56) References Cited

U.S. PATENT DOCUMENTS

| | | | |
|---|---|---|---|
| 4,229,184 A | 10/1980 | Gregg | |
| 4,290,779 A | 9/1981 | Qader | |
| 4,415,339 A | 11/1983 | Aiman et al. | |
| 5,236,470 A * | 8/1993 | Levin | 48/210 |
| 5,247,796 A * | 9/1993 | Parker et al. | 60/673 |
| 5,647,877 A * | 7/1997 | Epstein | 48/210 |
| 6,872,378 B2 * | 3/2005 | Weimer et al. | 423/650 |
| 7,176,246 B2 | 2/2007 | Rodriguez et al. | |

FOREIGN PATENT DOCUMENTS

| | | |
|---|---|---|
| FR | 2503177 | 10/1982 |
| GB | 2073869 | 10/1981 |

OTHER PUBLICATIONS

European Office action dated Nov. 9, 2011.

\* cited by examiner

*Primary Examiner* — Nina Bhat
(74) *Attorney, Agent, or Firm* — Bachman & LaPointe, P.C.

(57) ABSTRACT

An apparatus for thermochemical conversion of solid carbonaceous materials into fluid fuels using a fluid source of oxygen and an external source of concentrated radiation includes a reactor having a wall defining a cavity; a radiation inlet positioned in the wall for passing concentrated radiation into the cavity; and at least one inlet for introducing a fluid reactant flow of a source of oxygen and particles of carbonaceous material into direct exposure to the concentrated radiation in the cavity so as to heat and thermochemically convert the particles into fluid fuel. A process and system are also provided. The fluid source of oxygen is preferably steam and the carbonaceous material is preferably particles of petcoke.

11 Claims, 12 Drawing Sheets

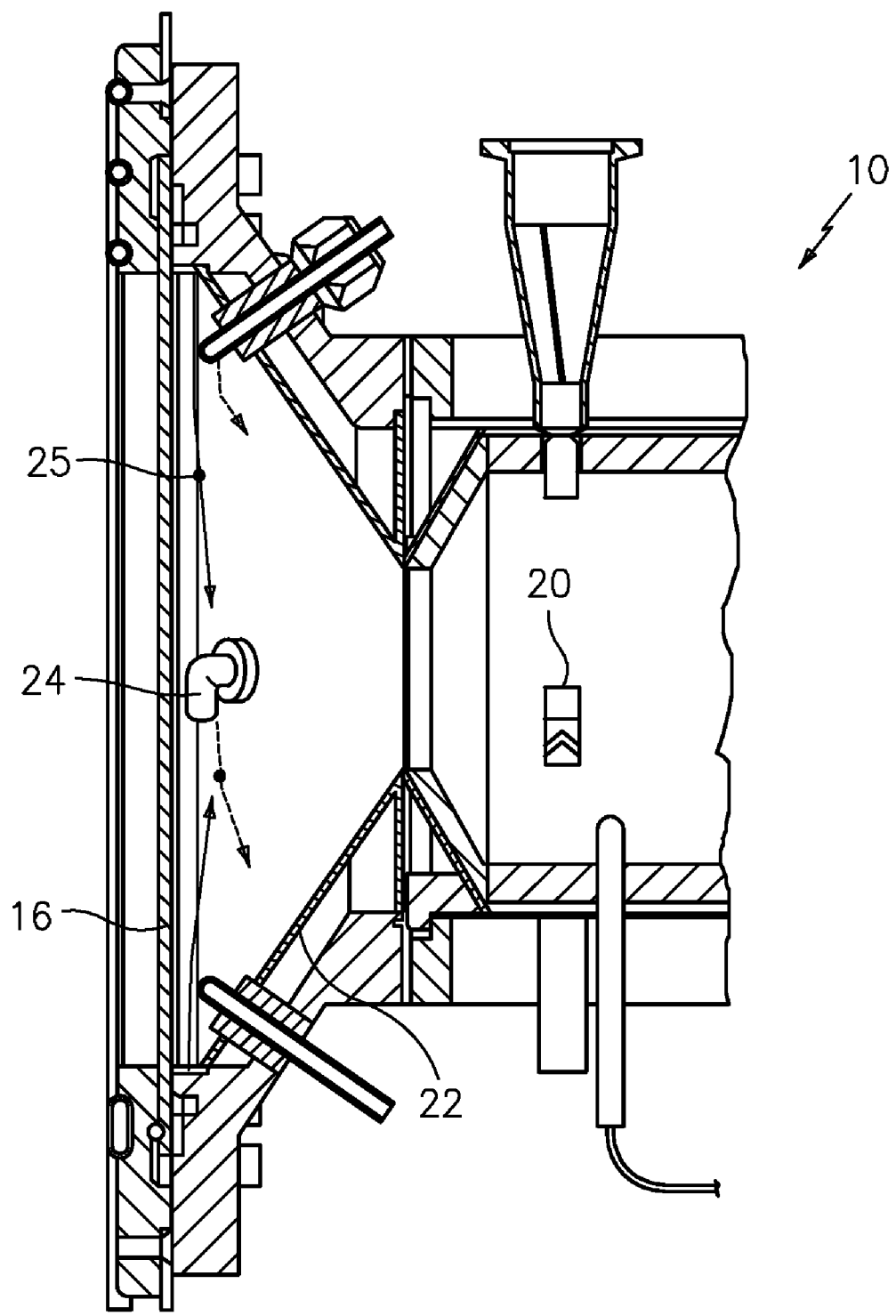
FIG. 1α

METHOD FOR GASIFICATION OF CARBONACEOUS SOLID MATERIALS

CROSS REFERENCE TO RELATED APPLICATIONS

This is a division of U.S. patent application Ser. No. 11/369,517, filed Mar. 6, 2006 now U.S. Pat. No. 7,449,158 which is a continuation-in-part of U.S. patent application Ser. No. 10/954,507, filed Sep. 29, 2004 now U.S. Pat. No. 7,176,246, which claimed the benefit of the filing date of provisional application No. 60/508,064, filed Oct. 1, 2003. This application also claims the benefit of provisional application No. 60/659,807, filed Mar. 8, 2005.

BACKGROUND OF THE INVENTION

The present invention relates to an apparatus, a system and method for using same for thermochemically converting carbonaceous solid materials such as petcoke into synthetic fluid fuels such as syngas.

Anthropogenic emissions of green house gases and other pollutants can be significantly reduced or even completely eliminated by replacing fossil fuels with cleaner fuels, e.g. solar fuels. Further, the conversion of solar energy into a chemical energy carrier that can be long-term stored and long-range transported would overcome major drawbacks of solar energy, namely, that solar energy is conventionally a diluted, intermittent, and unequally distributed energy source.

The replacement of fossil fuels with solar fuels is a long-term goal requiring the development of novel technologies. Intermediate progress along this transition would also be desirable. Clearly, the need remains for a more viable process for using solar energy to overcome the limitations mentioned above.

It is therefore the primary object of the present invention to provide a process whereby solar energy is converted to chemically stored energy.

It is a further object of the invention to provide a process wherein the stored energy is a relatively clean fossil fuel.

Other objects and advantages will appear herein below.

SUMMARY OF THE INVENTION

According to the invention, the foregoing objects and advantages have been attained.

In accordance with the invention, an apparatus for thermochemical conversion of solid carbonaceous materials into fluid fuels using a fluid source of oxygen and an external source of concentrated radiation is provided which comprises a reactor having a wall defining a cavity; a radiation inlet positioned in the wall for passing concentrated radiation into the cavity; and at least one inlet for introducing a fluid reactant flow of a source of oxygen and particles of carbonaceous material into direct exposure to the concentrated radiation in the cavity so as to heat and thermochemically convert the particles into fluid fuel.

The fluid source of oxygen serves only as the gasifying agent, and the external source of concentrated radiation serves to sustain the process.

In further accordance with the invention, a process for converting solid carbonaceous materials into fluid fuels using an external source of concentrated radiation is provided which comprises the steps of providing a reactor comprising a wall defining a cavity; a radiation inlet through the wall for passing concentrated radiation into the cavity; and at least one inlet for introducing a fluid reactant flow of a source of oxygen and particles of carbonaceous material into direct exposure to the concentrated radiation in the cavity so as to heat and thermochemically convert the particles into fluid fuel; introducing concentrated radiation through the radiation inlet into the cavity; and introducing the reactant flow through the at least one inlet and into the cavity in the presence of the concentrated radiation so as to heat and thermodynamically convert the particles into fluid fuels.

In still further accordance with the invention, a system for converting carbonaceous material into a fluid fuel is provided which comprises: the reactor as described above; a generation unit communicated with the at least one inlet for providing the fluid source of oxygen; a feeder unit communicated with the at least one inlet for providing the particles of solid carbonaceous material; a generation unit communicated with the at least one inlet to the radiation inlet chamber for providing the flow of gas to aerodynamically protect the window from material deposition and overheating; a cooling/heating unit to maintain the radiation inlet chamber at a temperature that is above the condensation temperature of steam; and a control unit which communicates with the reactor, generation units, feeder unit, and cooling/heating unit to operate the system to produce fluid fuel from the solid carbonaceous material.

BRIEF DESCRIPTION OF THE DRAWINGS

A detailed description of preferred embodiments of the present invention follows, with reference to the attached drawings, wherein:

FIG. 1a is a side sectional view of a reactor according to the invention;

DETAILED DESCRIPTION

Figure 1:
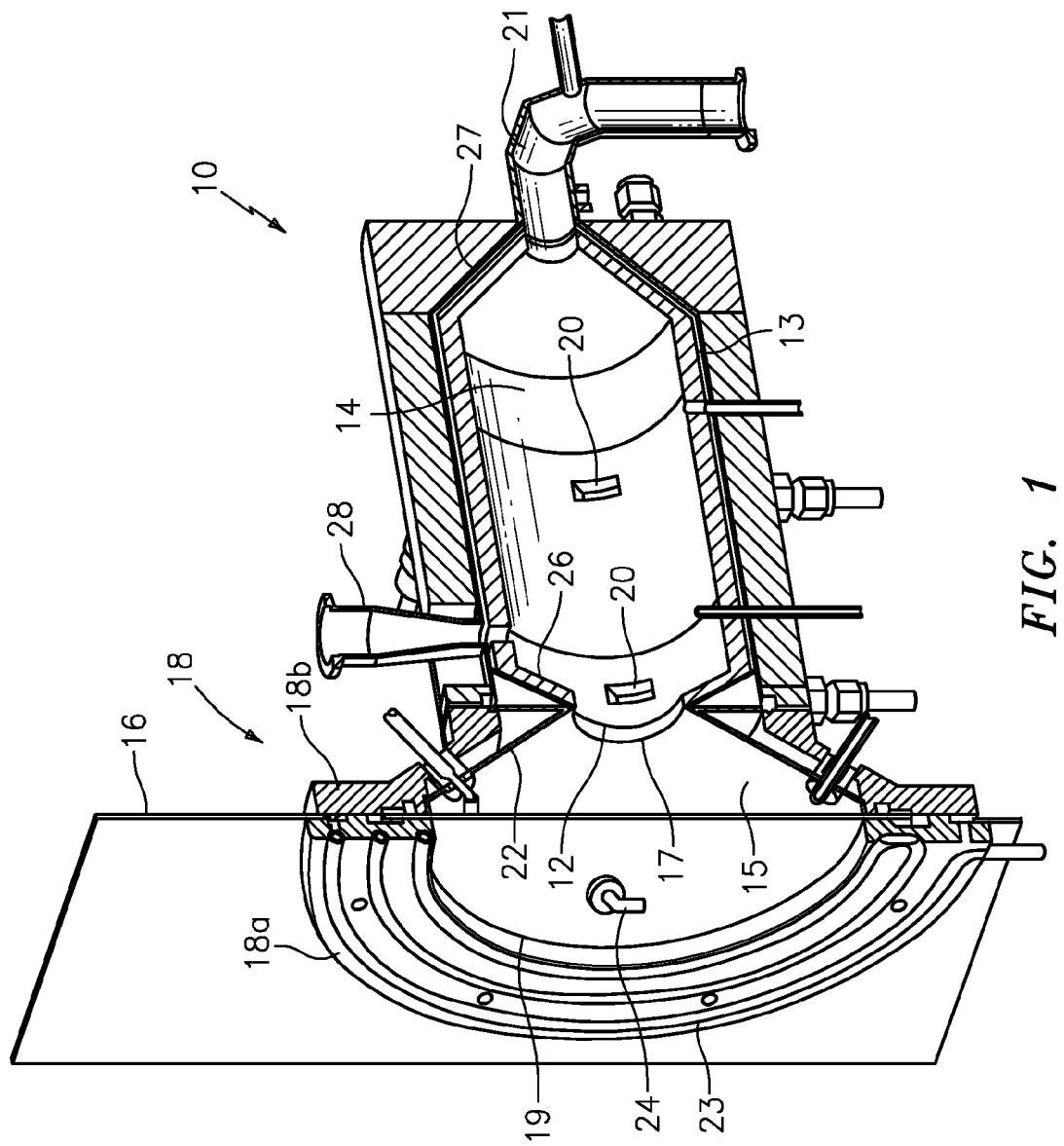
FIG. 1 is a partially sectional view of a reactor according to the invention.

The process underlying the apparatus of the present invention and operation of same is described in co-pending and commonly owned U.S. patent application Ser. No. 10/954,507, filed Sep. 29, 2004. This application is incorporated herein in its entirety by reference. The process concerns the thermochemical conversion of carbonaceous materials, for example petroleum coke (petcoke), into synthetic fluid fuels, for example synthesis gas (syngas). The process uses an oxygen source, preferably steam, as a gasification agent.

The process uses an external source of concentrated thermal radiation for supplying high-temperature process heat for the endothermic transformation. Of special interest is the use of concentrated solar radiation as the source of process heat. In using a hybrid solar/fossil endothermic process, a preferred embodiment of which involves use of fossil fuels exclusively as the chemical source for $H_2$ production and concentrated solar power exclusively as the energy source of process heat, the present invention offers a viable route for fossil fuel decarbonization and creates a transition path towards solar hydrogen.

The advantages of supplying solar energy for process heat are four-fold: 1) the calorific value of the feedstock is upgraded; 2) the gaseous products are not contaminated by byproducts of combustion; 3) the discharge of pollutants to the environment is avoided; and 4) expenses due to combustion of fossil fuels and related investments for oxygen generation are substantially reduced.

A $2^{nd}$-Law analysis for generating electricity using the solar gasification products indicates a potential for doubling the specific electrical output and, consequently, halving the specific $CO_2$ emissions, vis-à-vis conventional petcoke-fired power plants.

Feeds for the present invention are preferably any carbonaceous materials, preferably solid materials and/or slurries or other reactant streams containing same. Preferred material is particulate carbonaceous material, for example particles of petcoke as one non-limiting example. Such particles can preferably have an average diameter of between about 1 and about 1,000 microns, preferably less than about 100 microns. Two samples of petcoke, with relevant properties, are further described in Table 1 below:

TABLE 1

|   | Flexicoke | PD coke |
|---|---|---|
| C | 92.70 | 88.21 |
| H | 0.67 | 4.14 |
| O | 0.92 | 1.46 |
| N | 0.90 | 2.28 |
| S | 1.98 | 4.16 |
| LHV [kJ/kg] | 32983 | 35876 |
| H/C [mol/mol] | 0.0859 | 0.5581 |
| O/C [mol/mol] | 0.0074 | 0.0124 |

In connection with the chemical thermodynamics and reaction kinetics of the pertinent reactions, the overall chemical conversion can be represented by the simplified net reaction:

$$C_1H_xO_y + (1-y)H_2O = \left(\frac{x}{2} + 1 - y\right)H_2 + CO \quad \text{Equation 1}$$

where x and y are the elemental molar ratios of H/C and O/C in the carbonaceous feedstock, respectively. Sulfur compounds and other impurities contained in the raw materials are omitted from the above equation. These are of course important from a process standpoint, but their exclusion does not affect the main aspect of this invention. The moisture content is also not accounted for in the above Equation 1, but the stoichiometric addition of water can be adjusted accordingly. In one example, wherein the feedstock is petcoke, the net process is endothermic by about 50% of the feedstock's heating value, and proceeds at a temperature above 1350 K to produce a mixture of mainly $H_2$ and CO, as corroborated experimentally using a directly-irradiated fluidized bed reactor. Generally, the endothermicity and reaction temperature of the feedstock should be determined and used to optimize the process. The reaction temperature is preferably maintained at between about 1300 and about 1800 K.

The present invention concerns a solar chemical reactor and method for carrying out the steam-gasification of carbonaceous solid materials using the reactor of the present invention. In the following paragraphs, the reactor is described.

An example of a reactor configuration for performing the steam-gasification of carbonaceous solid materials is schematically shown in FIG. 1. FIG. 1 shows a cylindrical cavity-reactor 10 that contains a radiation inlet 12 defined by a small opening or aperture to let concentrated radiation enter a cavity 14 defined by wall 13 of reactor 10. FIG. 1 shows cavity 14 having a cylindrical form. It should be appreciated that other cavity geometries are possible, but cavity-type geometries are preferable because of their ability to capture incoming radiation effectively.

The cavity can be defined by reactor wall 13 or other structure made out of suitable heat resistant materials, one example of which is Inconel™, a heat resistant metallic alloy provided by Inco Alloys International, Inc. The reactor walls can advantageously be provided with a ceramic liner such as a lining of $Al_2O_3$, or SiC, or other ceramic material. Further, the reactor can be insulated as well, for example with a ceramic insulation such as ceramic foam, for example with $Al_2O_3/ZrO_2$ ceramic foam or the like.

A radiation inlet chamber 15 is aligned with radiation inlet 12, and preferably has a first open end 17 connected with inlet 12 and a second open end 19. Ends 17, 19 are preferably defined at opposite ends of a cone shaped structure 22 which serves to further concentrate radiation passing along a converging flow path to inlet 12. A window 16, one preferred example of which is a clear fused quartz window, is positioned over open end 19. Window 16 is preferably mounted in a water-cooled ring 18 that also serves as a shield for spilled radiation. Ring 18 has two ring halves 18a, 18b, which in this embodiment clamp to both sides of window 16 to seal and hold window 16 in place. Ring half 18a is shown with a coolant tube 23 positioned along same. Tube 23 is communicated with a source of cooling fluid. Other window mounting arrangements are of course possible and well within the broad scope of the present invention.

As shown in FIG. 1, the radiation inlet chamber or passage 15 is preferably in the form of a converging flow structure, which converges in a radiation flow direction from a relatively larger flow area to a relatively smaller flow area. This structure is further discussed below.

According to one embodiment of the invention, window 16 can be actively cooled and kept clear from particles and/or condensable gases. In this embodiment, this is accomplished by defining an aerodynamic protection curtain created by tangential and radial flow through tangential and radial nozzles 24, 25 positioned in radiation inlet chamber 15 to create a desired flow pattern. This advantageously discourages particles from traveling out of the cavity of reactor 10, out through radiation inlet 12 and into the vicinity of window 16. Radial nozzles 25 are preferably substantially adjacent to window 16 while tangential nozzles 24 are preferably spaced inwardly from nozzles 25, and closer to radiation inlet 12. This serves to define a very stable vortex flow in radiation inlet chamber 15 which is effective to keep window 16 free of particles and other matter which could interfere with transmission of concentrated solar radiation, and also serves to help cool window 16 and prevent damage to same.

FIG. 1a further illustrates tangential nozzles 24 and radial nozzles 25 according to the invention. As shown, tangential nozzles 24 can be provided as bent or angled flow conduits which discharge fluid substantially tangential to an inside surface of radiation inlet chamber 15, and radial nozzles 25 can be defined by a ring gap in ring 18 which can be fed from an external source of purge gas, preferably steam. Of course, other protection flow configurations are possible within the broad scope of the present invention.

According to the invention, a preferred gas for use in creating the protection flow is steam, which simplifies the apparatus and system since steam is already used as the source of oxygen for the reaction. Of course, other configurations are possible within the scope of the invention, including the use of other fluids for generating the protective flow pattern and thereby protecting the window from deposition of particles and the like. One example of a suitable alternative fluid is Argon.

As set forth above, in the embodiment of FIG. 1, radiation inlet chamber 15 is defined in the shape of a frustum or cone 22 positioned between aperture 12 at one end and window 16/ring 18 at the other end. Cone 22 and especially the area around window 16 is preferably kept above a temperature of 373 K during operation so as to prevent steam condensation on window 16.

The radiation inlet chamber defined by cone 22 can advantageously have a length selected to sufficiently concentrate the radiation as desired, and to focus this radiation upon the interior or cavity of reactor 10 as desired. Cone 22 is a particularly suitable embodiment because of the smooth converging inner walls defined by same. Of course, other structures would be suitable within the scope of the present invention. FIG. 1 further shows cone 22 positioned to direct concentrated radiation along an axis A of reactor 10.

According to the invention, radiation inlet or aperture 12 preferably has a size or area which is less than about ⅓ of the area of the inside surface of reactor 10. Radiation inlet chamber 15 is also preferably provided having a length which is sufficient to distance window 16 from reactor 10 and thereby to help protect window 16 from overheating due to the high temperatures within reactor 10.

Inlets 24 and/or inlets 25 to radiation inlet chamber 15 are preferably axis-symmetrically distributed, that is, they are preferably positioned substantially equidistant from each other or at least from adjacent inlets, around a periphery of chamber 15. As set forth above, these inlets preferably include a set of tangential inlet ports or points 24 and a second set of radial inlet ports 25, each of which are preferably positioned in a separate plane, respectively, with the separate planes being axially spaced from each other.

As shown in FIG. 1, inlets 20 are also provided in reactor 10 to introduce steam or some other fluid medium, preferably a fluid source of oxygen, into reactor 10. Inlets 20 are preferably arranged substantially tangential to an inner surface so that flow through inlets 20 generates a helical or vortex flow through reactor 10 as desired.

Inlets 20 can likewise be arranged in two or more groups, preferably axially spaced from each other.

A particle feeding inlet 28 is also preferably provided for introducing particles to be treated into reactor 10. Particle feeding inlet 28 is preferably positioned substantially co-planar with one group of inlets 20 so as to encourage entrainment of particles fed to reactor 10 through inlet 28 in the fluid flow vortex created by flow through inlets 20.

As shown in FIG. 1, reactor 10 can preferably be provided having end walls 26, 27, which are themselves substantially cone shaped as shown. End wall 26 extends at an angle from aperture 12 to the full diameter of wall 13 of reactor 10, and end wall 27 extends at an angle from wall 13 of reactor 10 to the smaller diameter outlet 21 from reactor 10.

FIG. 1 shows outlet 21 arranged substantially coaxial with reactor 10. This is advantageous, particularly where a reaction does not go to completion and some particles exit the reactor.

Figure 1B:
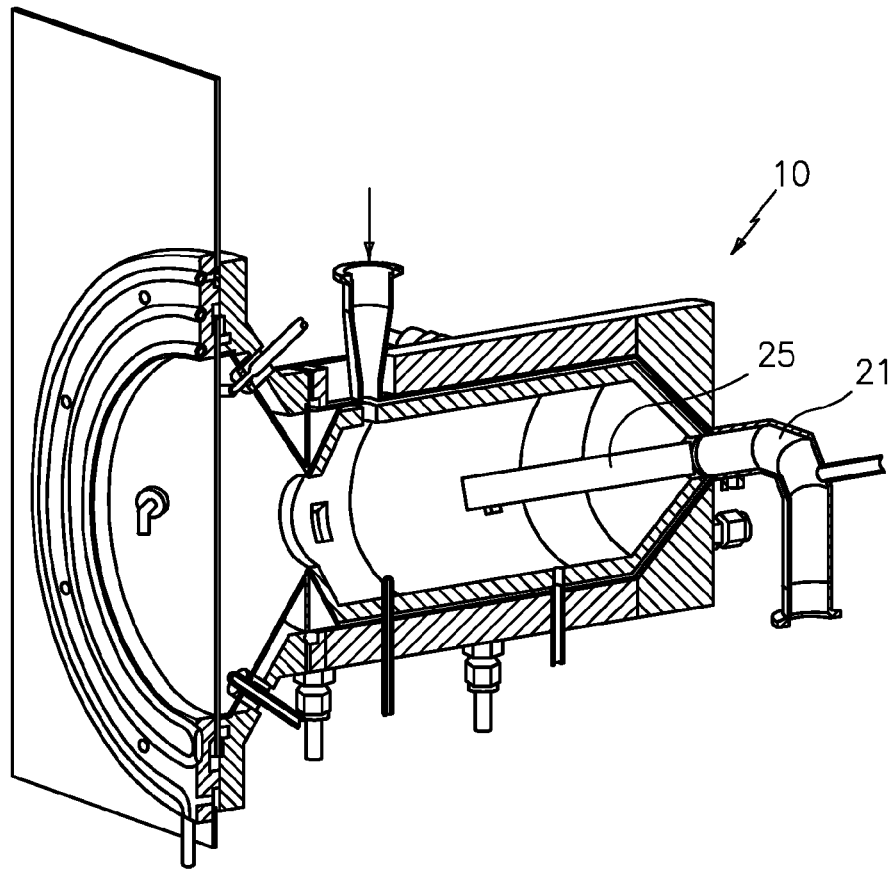
FIG. 1b illustrates an alternate embodiment of the invention.

FIG. 1b shows an alternate embodiment wherein an axial outlet tube 25 is positioned inside reactor 10 and along an axis thereof. In this embodiment, tube 25 can be positioned along an axis A of reactor 10, and can have both ends open. Such a configuration can function as a "cyclone separator" and separate unreacted particles from produced syngas. In this way, unreacted particles will remain in reactor 10 until gasified.

Figure 2A:
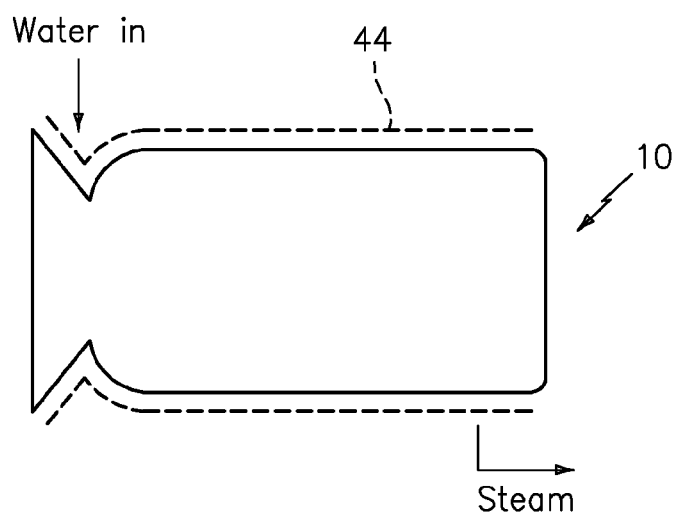
FIG. 2a illustrates a heat recovery embodiment of the invention.
Figure 2:
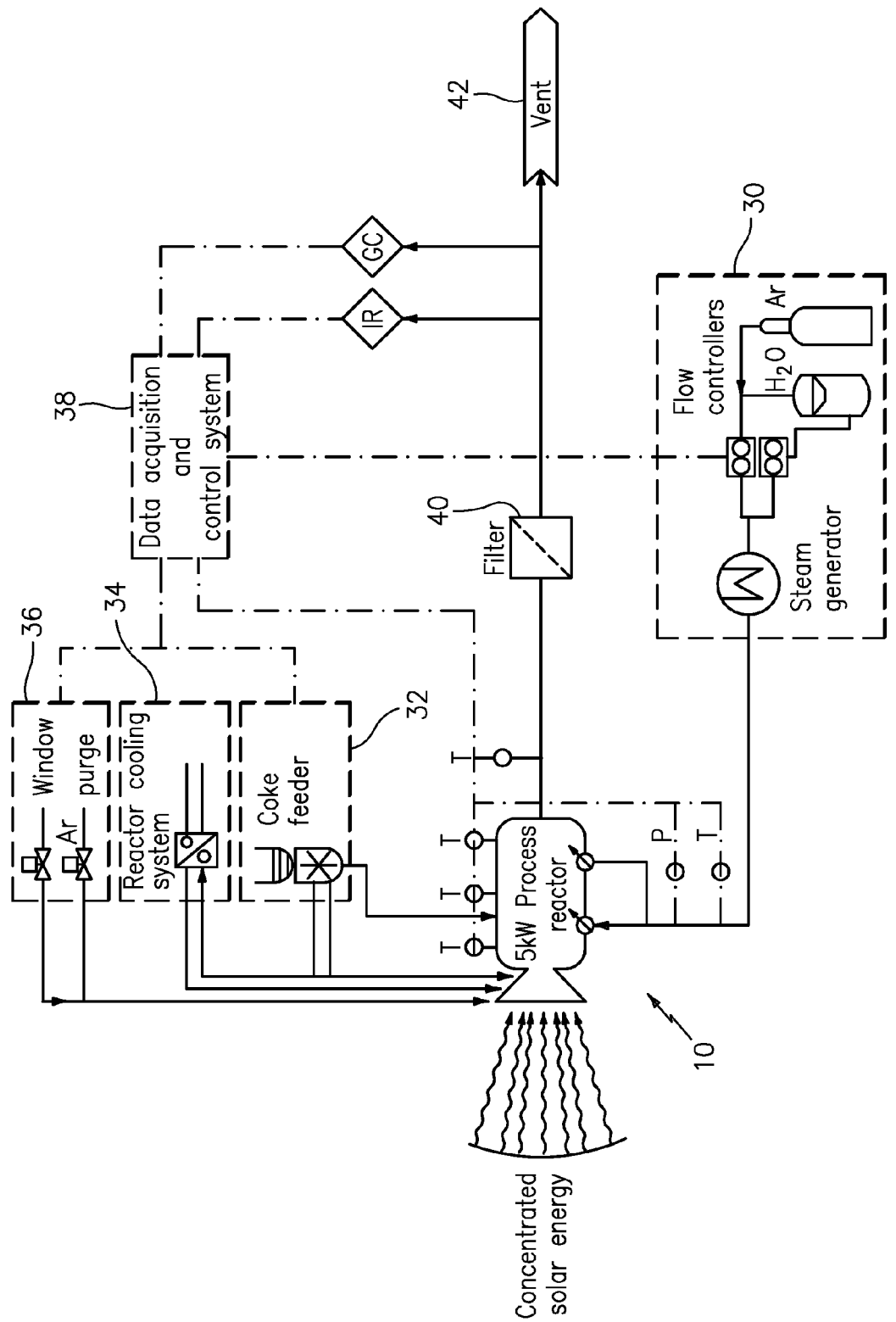
FIG. 2 is a schematic illustration of a system according to the invention.

Turning now to FIG. 2, a system according to the invention is further illustrated. FIG. 2 shows reactor 10 receiving concentrated solar energy, and also connected to a steam generator 30 for providing the fluid stream of oxygen source material. Reactor 10 is also connected to a coke feeder 32 for providing the carbonaceous solid material to be converted, a reactor cooling system 34 for providing coolant to tube 23 to cool cone 22 and window 16, and a window purge unit 36 for assisting in keeping window 16 clear of particles and the like as described above.

Each of these components is operatively communicated with a control system 38 which is programmed to control feed of reactants to reactor 10, properly control the cooling and purge functions, and the like. Products from reactor 10 are conveyed through a filter 40 as well as any other post processing equipment, and then to a vent 42 to other processing and/or storage. Also as shown, control unit 38 advantageously is also connected to sensors 44 along a line to vent 42 for monitoring qualities of the product.

In operation, particles of carbonaceous solid material and steam are injected into the reactor cavity 14 (FIG. 1) either as a slurry or separately. In the example of FIG. 1, steam and particles are injected separately, permitting separate control of mass flow rates and stoichiometry. Steam is introduced through several inlets 20 as shown, and may also be introduced into radiation inlet chamber 15 through inlets 24. Based on flow visualization experiments and CFD simulations, suitable flow patterns in terms of residence time and flow stability are obtained with two sets of symmetrically distributed tangential nozzles 20, as shown in FIG. 1. These sets can advantageously be positioned in a plurality, preferably two, planes drawn normal to the axis A of reactor 10. These planes can be spaced as appropriate along the axis of the reactor, and advantageously serve to define the desired helical flow pattern of steam with entrained particles through the reactor. The different planes of steam injection inlets can be fed uniformly or, preferably, the set of inlets which is closer to aperture 12 can be the primary injection location and can be fed with a greater flow rate than planes of inlets located further downstream along axis A.

In FIG. 1, particle-feeding unit 28 is shown positioned on the top of the reactor vessel 10 with an inlet port preferably located in the same plane as the primary steam injection system, allowing for immediate entrainment of particles by the steam flow. Inside cavity 14, the gas-particle stream forms a vortex flow that progresses towards the rear along a helical path. With this arrangement, the particles are directly exposed to high-flux irradiation, providing efficient heat transfer directly to the reaction site, and bypassing the limitations imposed by indirect heat transfer through reactor walls. Energy is absorbed by the reactants and raises their temperature to above about 1300K and drives the gasification reaction. Reaction products exit through outlet tube 21 at the rear side of the cavity.

These reaction products, when reactor 10 is operated according to the invention, are produced in the form of a substantially equimolar mixture of hydrogen and carbon monoxide, with less than about 5% volume of carbon dioxide, as desired.

According to the invention, the source of radiation is preferably concentrated solar energy. Such concentrated solar energy can be created using carious methods and apparatus known to a person of skill in the art. The structure of the present invention, however, is particularly preferred as this structure is particularly effective at delivering concentrated solar energy to reactor 10 for carrying out the inventive process.

Of course, while the source of radiation is preferably exclusively concentrated solar energy, an alternate embodiment of the invention uses a hybrid of concentrated solar energy and fossil fuel generated energy to provide the external radiation.

In accordance with an alternate embodiment of the invention, the hydrocarbon material to be reacted can advantageously be a combination of particulate carbonaceous material such as petcoke, and a fossil fuel. When a mixture of these materials is exposed to radiation according to the invention, the fossil fuel serves both to absorb external radiation as desired and also acts as a source of chemical reactants.

The source of oxygen can advantageously be any of a wide variety of oxygen sources, such as steam, elemental oxygen, metal oxides and the like, and combinations thereof. While any of these can be utilized according to the invention, steam is particularly suitable for use in accordance with the present invention. The following description will be given using steam as the oxygen source.

FIG. 2a schematically illustrates an alternate embodiment of the invention wherein waste heat and/or spilled radiation are used to heat water to make steam, for example at inlets 20, 24, 25. FIG. 2a schematically illustrates coil 44 or other heat exchange structure positioned to exchange heat with reactor 10 and/or cone 22. Coil 44 can be fed with water from any suitable source, and spilled radiation from cone 22 and/or heat from reactor 10 and/or cone 22 heat this water to steam which can then be fed directly to inlets 20, 24 and/or 25 to meet some or all steam needs of reactor 10.

Figure 5:
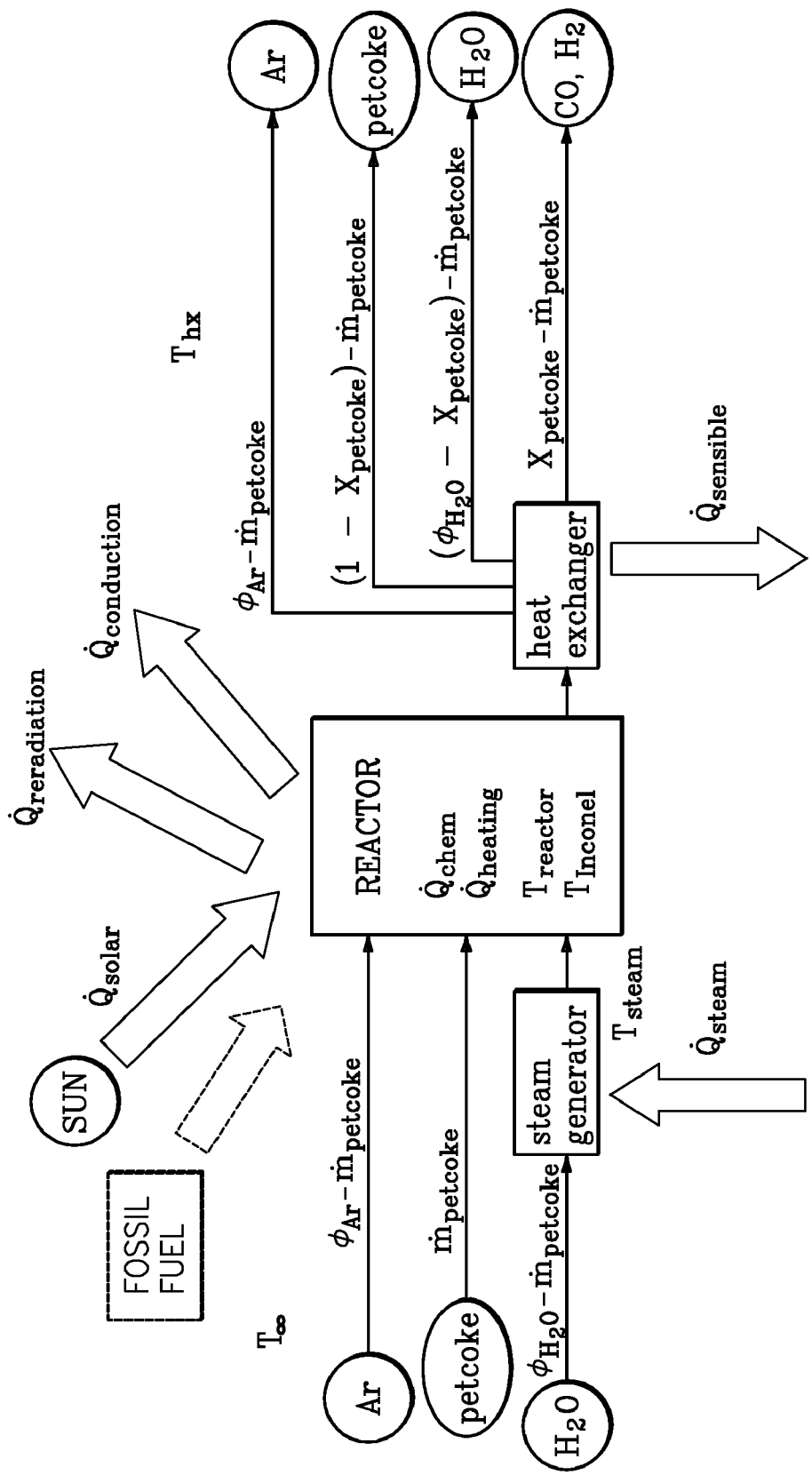
FIG. 5 further illustrates an energy balance of a system according to the invention.

FIG. 5 shows an energy balance for a system according to the invention and will be discussed further below. In addition, FIG. 5 schematically illustrates the reactor and shows concentrated radiation to the reactor. As set forth above, this concentrated radiation is preferably concentrated solar radiation as shown in solid lines in FIG. 5. Alternatively, as set forth above, concentrated radiation can be supplemented using fossil fuels as illustrated in dashed lines in FIG. 5.

A series of sample runs were carried out using a system such as that illustrated in FIG. 2. The source of concentrated radiation was a 120 square meter sun-tracking heliostat having an 8.5 m diameter paraboloid concentrator, and this delivers up to 40 kW at peak concentration ratios exceeding 5,000 suns. A Venetian blind type shutter located between the heliostat and the concentrator controls power input to the reactor. Radiative solar flux intensities were measured optically with a calibrated CCD camera by recording the image of the sun on a water-cooled alumina coated Lambertian (diffusively reflecting) plate positioned at the focal plane. The reactor was positioned with its aperture at the focal plane and intercepting the regions of maximum solar flux intensity. Integration of the incident radiative flux over the reactor's aperture yielded the solar power input, referred to as $Q_{solar}$.

Reactor wall temperatures were measured in twelve locations with type K thermocouples, inserted into the Inconel walls and not exposed to direct irradiation. The nominal cavity temperature was measured with a solar-blind pyrometer that is not affected by the reflected solar irradiation because it measures in a narrow wavelength interval around 1.39 microns where solar irradiation is mostly absorbed by the atmosphere. Gas flows were controlled using Bronkhorst HI-TEC electronic flow controllers. The coke-feeding ratio was determined by measuring the weight difference of the particle conveyor, with 5% accuracy. The reactor's pressure was monitored with pressure transducers, while a pressure safety valve prevented overpressure derived from a five-fold volumetric growth due to gas formation and thermal expansion. The gaseous products were analyzed on-line by gas chromotagraphy (GC, High speed Micro GC G2890A by Agilent Technologies, equipped with a molecular sieve 5A and Hay-Sep A capillary columns). Gas analysis was supplemented by IR-based detector for $H_2$ (Calomet-6 by Siemens). Representative solid product samples collected at the filter downstream of the reactor were examined by scanning electron micrography. The water conversion, $X_{H_2O}$, was calculated from the oxygen mass balance using the product gas flows $\eta CO$, $\eta CO_2$ (calculated from GC measurements and feed gas flows) as:

$$X_{H_2O} = \frac{\dot{n}_{CO} + 2\dot{n}_{CO_2}}{\dot{n}^0_{H_2O}} \qquad \text{Equation 2}$$

where $n^0_{H_2O}$ denotes the molar amount of water fed by the pump. The petcoke conversion, $X_{petcoke}$, is calculated from the carbon mass balance as:

$$X_{petcoke} = \frac{\dot{n}_{CO} + \dot{n}_{CH_4} + \dot{n}_{CO_2}}{\dot{n}^0_C} \qquad \text{Equation 3}$$

where $\eta^0_C$ denotes the molar amount of carbon fed by the calibrated feeder.

Example

A solar reactor prototype based on the aforementioned concept was tested in a high-flux solar furnace for a solar power input in the range 3.3-6.6 kW, a nominal reactor temperature in the range 1296-1818 K, and a reactant mass flow rate in the range of 1.85-4.45 gr petcoke/min and 3.68-9.04 gr steam/min. In these initial experiments, chemical conversions of petcoke and steam reached up to 87% and 69% molar, respectively.

Figure 3:
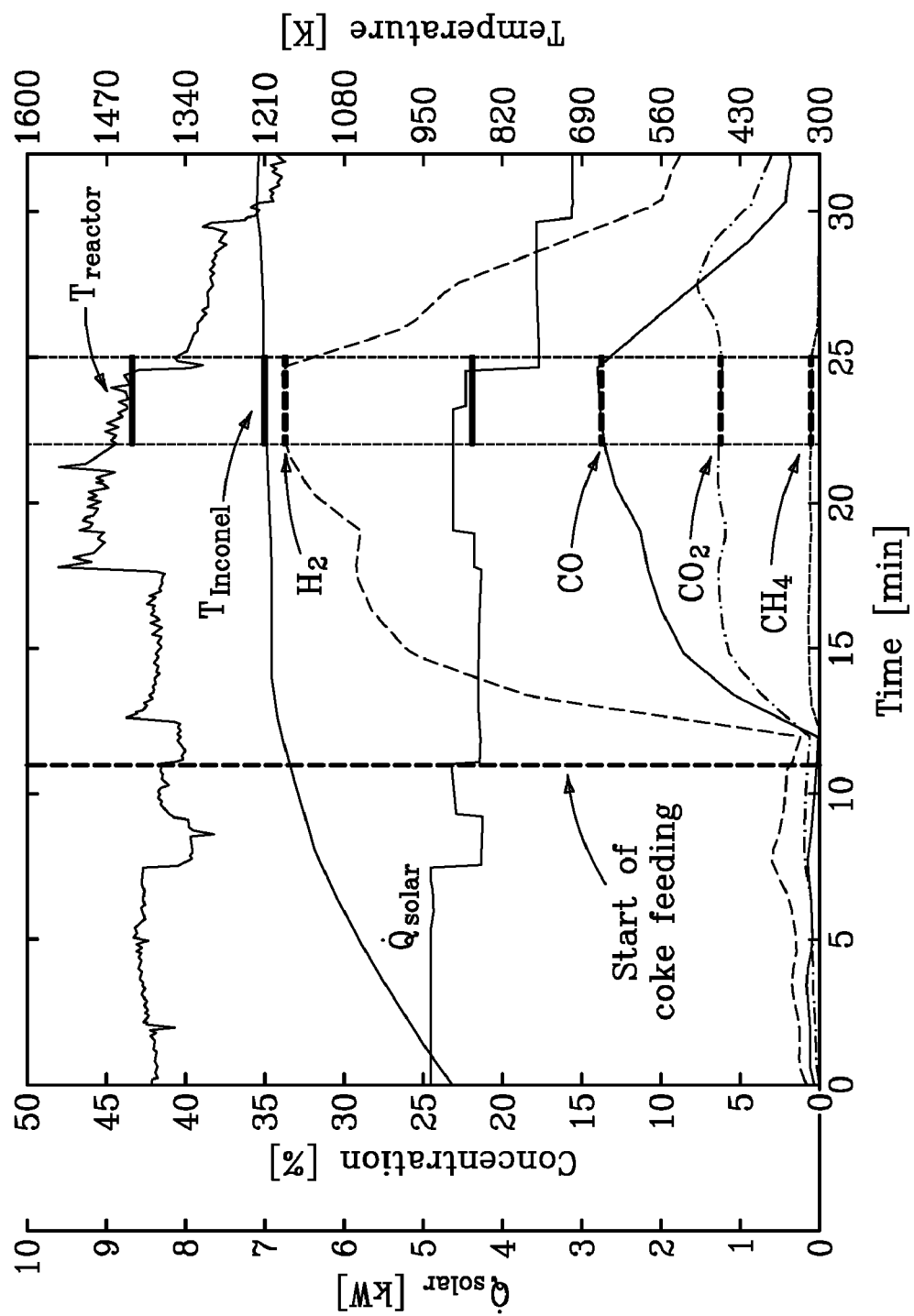
FIG. 3 illustrates temperatures and gas compositions for a sample run of a system according to the invention.

Temperatures and gas compositions for a representative solar run (run #7) are shown in FIG. 3. In this run, the reactor was first heated to above 1500 K under an Ar flow. Thereafter, reactants were introduced during the interval of 12 minutes at a rate of 3.1 gr petcoke/min and 6 gr $H_2O$/min, corresponding to a $H_2O$:C molar ratio of 1.3. Average values under approximate steady-state condition are indicated by gray bars: $Q_{solar}$=4.3 kW, $T_{reactor}$=1425 K, $T_{Inconel}$=1210 K, $\eta_{H_2}$=0.2 mol/min, $\eta_{CO}$=0.064 mol/min, $\eta_{CO_2}$=0.04 mol/min, and $\eta_{CH_4}$=0.007 mol/min. Two energy conversion efficiencies describe the reactor's thermal performance. η1 is defined as the portion of solar energy stored as chemical energy:

$$\eta_1 = \frac{\dot{Q}_{chem}}{\dot{Q}_{solar}} = \frac{X_{petcoke} \cdot \dot{n}_{petcoke} \cdot \Delta H_R |_{298}}{\dot{Q}_{solar}} \qquad \text{Equation 4}$$

$\eta_2$ is defined as the portion of solar energy net absorbed, both as chemical energy and sensible heat (which potentially can be recovered), and takes into account the heat required for steam generation:

$$\eta_2 = \frac{\dot{Q}_{chem} + \dot{Q}_{sensible}}{\dot{Q}_{solar} + \dot{Q}_{steam}} \qquad \text{Equation 5}$$

$$= \frac{X_{petcoke} \cdot \dot{n}_{petcoke} \cdot \Delta H_R \Big|_{298} + \sum_i^{species} \int_{298K}^{T_{reaction}} \dot{n}_i \cdot c_{p,i}(T) \, dT}{\dot{Q}_{solar} + \dot{Q}_{steam}}$$

$\eta_1$ ranges from 5 to 9%; $\eta_2$ ranges from 10 to 20% (see Table 2, which shows operational conditions and a summary of measurements taken under approximate steady-state conditions during a series of sample runs).

TABLE 2

| Run # | | 1 | 2 | 3 | 4 | 5 | 6 | 7 | 8 | 9 | 10 | 11 | 12 |
|---|---|---|---|---|---|---|---|---|---|---|---|---|---|
| $\dot{m}_{petcoke}$ | [g/min] | 2.16 | 1.85 | 2.26 | 1.97 | 2.16 | 2.06 | 3.24 | 2.71 | 3.25 | 3.36 | 3.62 | 4.15 |
| $\dot{m}_{H_2O}$ | [g/min] | 6.03 | 3.68 | 6.03 | 6.03 | 6.03 | 6.03 | 6.03 | 6.03 | 6.02 | 6.03 | 6.03 | 6.03 |
| $\dot{n}_{Ar}$ | [mol/min] | 0.31 | 0.23 | 0.27 | 0.27 | 0.27 | 0.27 | 0.27 | 0.27 | 0.27 | 0.27 | 0.27 | 0.27 |
| $T_{reactor}$ | [K] | 1501 | 1380 | 1519 | 1546 | 1296 | 1477 | 1425 | 1582 | 1662 | 1471 | 1469 | 1494 |
| $T_{Inconel}$ | [K] | 1277 | 1194 | 1263 | 1203 | 1067 | 1099 | 1210 | 1221 | 1208 | 1202 | 1227 | 1219 |
| $\dot{n}_{H_2}$ | [mol/min] | 0.22 | 0.17 | 0.24 | 0.18 | 0.12 | 0.15 | 0.20 | 0.23 | 0.28 | 0.29 | 0.27 | 0.29 |
| $\dot{n}_{CO}$ | [mol/min] | 0.09 | 0.07 | 0.10 | 0.08 | 0.04 | 0.06 | 0.09 | 0.11 | 0.13 | 0.14 | 0.13 | 0.15 |
| $\dot{n}_{CO_2}$ | [mol/min] | 0.05 | 0.03 | 0.05 | 0.04 | 0.03 | 0.03 | 0.04 | 0.04 | 0.04 | 0.04 | 0.04 | 0.04 |
| $\dot{n}_{CH_4}$ | [mol/min] | 0.0036 | 0.0049 | 0.0082 | 0.0081 | 0.0115 | 0.0070 | 0.0066 | 0.0060 | 0.0082 | 0.0043 | 0.0068 | 0.0035 |
| $X_{petroke}$ | [—] | 0.83 | 0.75 | 0.87 | 0.78 | 0.47 | 0.62 | 0.54 | 0.74 | 0.71 | 0.71 | 0.63 | 0.59 |
| $X_{H_2O}$ | [—] | 0.55 | 0.69 | 0.58 | 0.46 | 0.28 | 0.38 | 0.52 | 0.58 | 0.65 | 0.68 | 0.64 | 0.68 |
| $\dot{Q}_{solar}$ | [W] | 4488 | 4990 | 4582 | 4438 | 3270 | 4251 | 4327 | 5336 | 6108 | 5694 | 4578 | 6656 |
| $\dot{Q}_{reradiation}$ | [W] | 683 | 582 | 713 | 742 | 401 | 640 | 583 | 850 | 1029 | 720 | 648 | 808 |
| $\dot{Q}_{conduction}$ | [W] | 5310 | 4863 | 5238 | 4915 | 4178 | 4353 | 4951 | 5013 | 4943 | 4906 | 5043 | 4999 |
| $\dot{Q}_{heating}$ | [W] | 442 | 270 | 434 | 436 | 341 | 411 | 423 | 474 | 525 | 447 | 453 | 480 |
| $\dot{Q}_{chem}$ | [W] | 309 | 241 | 340 | 269 | 174 | 223 | 306 | 347 | 398 | 413 | 394 | 422 |
| $\dot{Q}_{sensible}$ | [W] | 442 | 270 | 434 | 436 | 341 | 411 | 423 | 474 | 525 | 447 | 453 | 480 |
| $\dot{Q}_{steam}$ | [W] | 278 | 170 | 278 | 278 | 278 | 278 | 278 | 278 | 278 | 278 | 278 | 278 |
| $\eta_1$ | [—] | 0.069 | 0.048 | 0.074 | 0.061 | 0.053 | 0.052 | 0.071 | 0.065 | 0.065 | 0.072 | 0.086 | 0.063 |
| $\eta_2$ | [—] | 0.158 | 0.099 | 0.162 | 0.150 | 0.143 | 0.138 | 0.157 | 0.147 | 0.149 | 0.146 | 0.176 | 0.131 |
| $\tau$ | [s] | 1.14 | 1.46 | 1.19 | 123 | 1.55 | 127 | 124 | 1.05 | 0.94 | 0.99 | 1.18 | 0.87 |
| Run # | | 13 | 14 | 15 | 16 | 17 | 18 | 19 | 20 | 21 | 22 | 23 | 24 |
| $\dot{m}_{petcoke}$ | [g/min] | 4.18 | 3.12 | 3.19 | 3.20 | 3.44 | 3.65 | 4.45 | 3.24 | 3.21 | 3.21 | 2.69 | 2.48 |
| $\dot{m}_{H_2O}$ | [g/min] | 6.03 | 7.03 | 8.03 | 9.04 | 9.03 | 9.03 | 9.03 | 9.03 | 9.03 | 9.03 | 9.03 | 9.03 |
| $\dot{n}_{Ar}$ | [mol/min] | 0.27 | 0.27 | 0.27 | 0.27 | 0.27 | 0.27 | 0.27 | 0.27 | 0.27 | 0.27 | 0.27 | 0.27 |
| $T_{reactor}$ | [K] | 1545 | 1787 | 1818 | 1750 | 1723 | 1684 | 1681 | 1464 | 1444 | 1361 | 1476 | — |
| $T_{Inconel}$ | [K] | 1208 | 1214 | 1224 | 1231 | 1230 | 1220 | 1213 | 1266 | 1224 | 1137 | 1325 | 1297 |
| $\dot{n}_{H_2}$ | [mol/min] | 0.28 | 0.26 | 0.26 | 0.26 | 0.30 | 0.31 | 0.33 | 0.32 | 0.29 | 0.23 | 0.26 | 0.25 |

TABLE 2-continued

| | | | | | | | | | | | | | |
|---|---|---|---|---|---|---|---|---|---|---|---|---|---|
| $\dot{n}_{CO}$ | [mol/min] | 0.13 | 0.12 | 0.13 | 0.12 | 0.12 | 0.14 | 0.15 | 0.13 | 0.12 | 0.09 | 0.11 | 0.10 |
| $\dot{n}_{CO_2}$ | [mol/min] | 0.04 | 0.05 | 0.05 | 0.05 | 0.06 | 0.06 | 0.06 | 0.06 | 0.06 | 0.05 | 0.06 | 0.05 |
| $\dot{n}_{CH_4}$ | [mol/min] | 0.0078 | 0.0066 | 0.0072 | 0.0080 | 0.0098 | 0.0115 | 0.0107 | 0.0089 | 0.0109 | 0.0143 | 0.0037 | 0.0050 |
| $X_{petroke}$ | [—] | 0.54 | 0.71 | 0.72 | 0.70 | 0.70 | 0.71 | 0.61 | 0.78 | 0.75 | 0.59 | 0.79 | 0.83 |
| $X_{H_2O}$ | [—] | 0.62 | 0.56 | 0.50 | 0.44 | 0.47 | 0.50 | 0.52 | 0.51 | 0.48 | 0.37 | 0.44 | 0.42 |
| $\dot{Q}_{solar}$ | [W] | 5883 | 5568 | 5767 | 6637 | 5294 | 5683 | 6976 | 4636 | 5014 | 4341 | 4564 | 5413 |
| $Q_{reradiation}$ | [W] | 828 | 1247 | 1330 | 1233 | 1091 | 1039 | 1115 | 644 | 645 | 518 | 655 | — |
| $Q_{conduction}$ | [W] | 4940 | 4974 | 5025 | 5066 | 5061 | 5007 | 4969 | 5254 | 5024 | 4557 | 5573 | 5421 |
| $Q_{heating}$ | [W] | 504 | 628 | 700 | 718 | 711 | 696 | 722 | 559 | 547 | 501 | 550 | — |
| $Q_{chem}$ | [W] | 388 | 387 | 397 | 390 | 417 | 449 | 473 | 437 | 417 | 329 | 368 | 355 |
| $Q_{sensible}$ | [W] | 504 | 628 | 700 | 718 | 711 | 696 | 722 | 559 | 547 | 501 | 550 | — |
| $Q_{steam}$ | [W] | 278 | 324 | 370 | 416 | 416 | 416 | 416 | 416 | 416 | 416 | 416 | 416 |
| $\eta_1$ | [—] | 0.066 | 0.070 | 0.069 | 0.059 | 0.079 | 0.079 | 0.068 | 0.094 | 0.083 | 0.076 | 0.081 | 0.066 |
| $\eta_2$ | [—] | 0.149 | 0.176 | 0.181 | 0.159 | 0.202 | 0.192 | 0.166 | 0.200 | 0.180 | 0.175 | 0.184 | — |
| $\tau$ | [s] | 0.96 | 0.94 | 0.86 | 0.72 | 0.86 | 0.81 | 0.69 | 0.96 | 0.90 | 1.01 | 0.97 | 0.85 |

Figure 4:
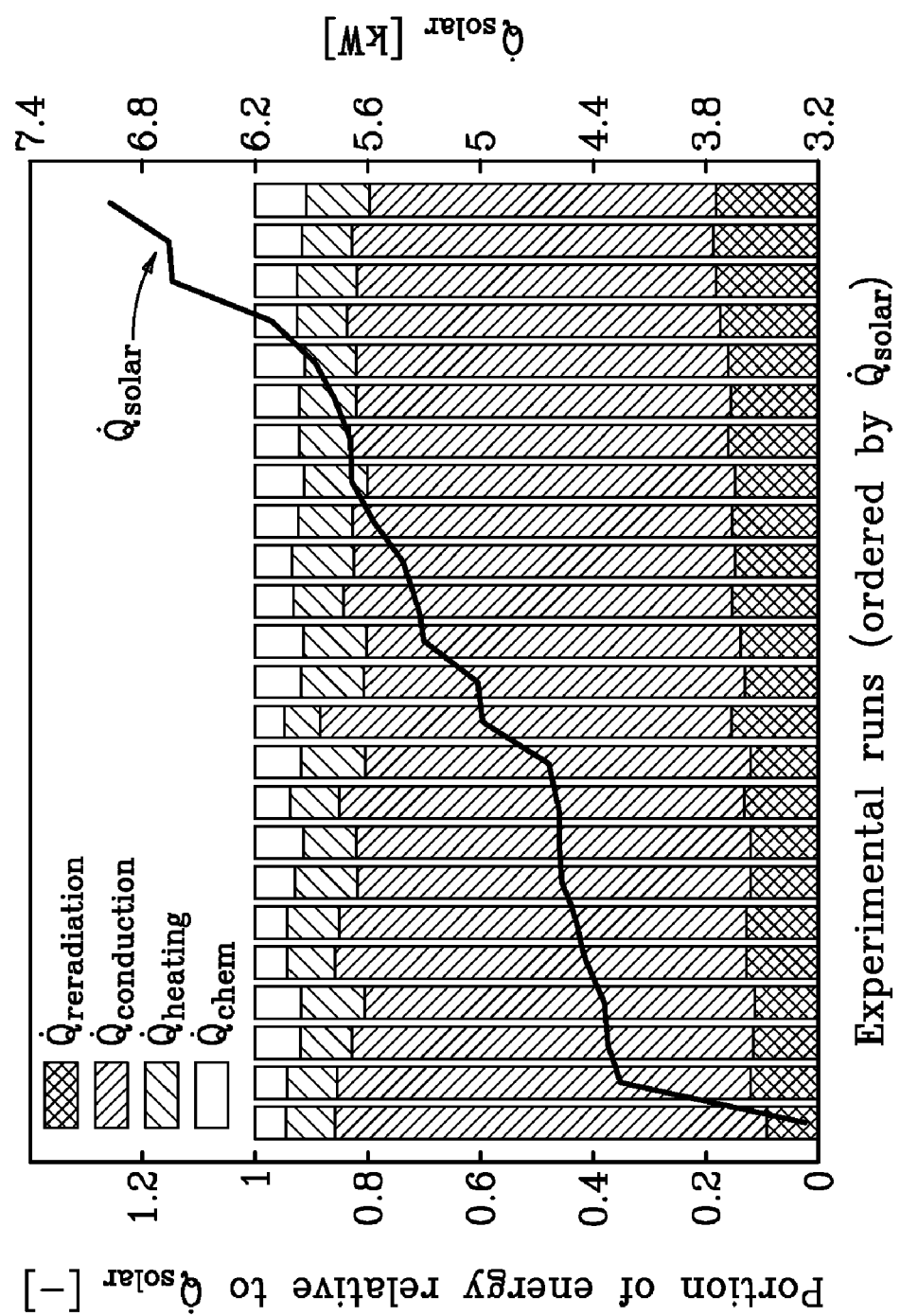
FIG. 4 illustrates a portion of concentrated solar radiation incorporated into the gas product in several sample runs of a system according to the invention.

The complete energy balance for each experimental run, indicated in percent of the solar power input, is shown in FIG. 4. Heat losses are principally due to attenuation by the window and re-radiation through the aperture (~16% of $Q_{solar}$) and conduction through the reactor walls (~67% of $Q_{solar}$). As expected, the radiative losses are strongly temperature dependent. To some extent, they can be minimized by augmenting the input solar power flux, e.g. by means of a CPC, allowing the use of a smaller aperture for capturing the same amount of energy. Increasing the reactor temperature further results in a higher reaction rate and degree of chemical conversion, which in turn results in higher energy conversion efficiencies.

The process flow is depicted in FIG. 5. It includes the solar chemical reactor, the steam generator, and a heat exchanger. Indicated are the mass and energy flows. $\phi_{Ar}$ and $\phi_{H_2O}$ are the Ar:C and H2O:C molar ratios in the feed, respectively. $Q_{steam}$ is supplied to evaporate and superheat water to $T_{steam}$ at 423.15 K, $$\dot{Q}_{steam} = \dot{n}_{H_2O} \cdot \Delta H_{T_\infty \to T_{steam}} \quad \text{Equation 6}$$

In the reactor, $Q_{heating}$ and $Q_{chem}$ are supplied for heating the reactants to $T_{reactor}$ and for the enthalpy change of the reaction, respectively:

$$\dot{Q}_{heating} = \phi_{H_2O} \cdot \dot{n}_{petcoke} \cdot \int_{T_{steam}}^{T_{reactor}} c_{p,H_2O(g)}(T) \cdot dT + \quad \text{Equation 7}$$
$$\phi_{Ar} \cdot \dot{n}_{petcoke} \cdot \int_{T_\infty}^{T_{reactor}} c_{p,Ar(g)}(T) \cdot dT +$$
$$\dot{n}_{petcoke} \cdot \int_{T_\infty}^{T_{reactor}} c_{p,petcoke}(T) \cdot dT$$

$$\dot{Q}_{chem} = X_{petcoke} \cdot \dot{n}_{petcoke} \cdot \Delta H |_{T_{reactor}} \quad \text{Equation 8}$$

$Q_{sensible}$ is recovered in the heat exchanger by cooling the products and non-reacted reactants to $T_{hx} = 473$ K, $$\dot{Q}_{sensible} = \dot{n}_{H_2} \cdot \int_{T_{hx}}^{T_{reactor}} c_{p,H_2(g)}(T) \cdot dT + \quad \text{Equation 9}$$

-continued $$\dot{n}_{CO} \cdot \int_{T_{hx}}^{T_{reactor}} c_{p,CO(g)}(T) \cdot dT +$$
$$\dot{n}_{CO_2} \cdot \int_{T_{hx}}^{T_{reactor}} c_{p,CO_2(g)}(T) \cdot dT +$$
$$\dot{n}_{CH_4} \cdot \int_{T_{hx}}^{T_{reactor}} c_{p,CH_4(g)}(T) \cdot dT +$$
$$(1 - X_{H_2O}) \cdot \dot{n}_{H_2O} \cdot \int_{T_{hx}}^{T_{reactor}} c_{p,H_2O(g)}(T) \cdot dT +$$
$$\dot{n}_{Ar} \cdot \int_{T_{hx}}^{T_{reactor}} c_{p,Ar(g)}(T) \cdot dT +$$
$$(1 - X_{petcoke}) \cdot \dot{n}_{petcoke} \cdot \int_{T_{hx}}^{T_{reactor}} c_{p,petcoke}(T) \cdot dT$$

$Q_{conduction}$ is the power lost by conduction through the insulation, calculated using the thermal conductivities specified by the manufacturer and accounting for heat conduction bridges. Specific heats are known. $Q_{reradiation}$ is the power lost by re-radiation through the windowed aperture. It is composed by the reflected, emitted, and transmitted terms:

$$\dot{Q}_{reradiation} = A_{aperture} \cdot (\dot{q}_{reflected} + \dot{q}_{emitted} + \dot{q}_{transmitted})$$

where $$\dot{q}_{reflected} = \frac{\dot{Q}_{solar}}{A_{aperture}} \cdot \frac{\int_0^\infty e_{\lambda b}(T_{sun}) \cdot R_w(\lambda, T_{sun}) \cdot d\lambda}{\int_0^\infty e_{\lambda b}(T_{sun}) \cdot d\lambda} \quad \text{Equation 11}$$

$$\dot{q}_{emitted} = \frac{1}{2} \left( \frac{\dot{Q}_{solar}}{A_{aperture}} \cdot \frac{\int_0^\infty e_{\lambda b}(T_{sun}) \cdot A_w(\lambda, T_{sun}) \cdot d\lambda}{\int_0^\infty e_{\lambda b}(T_{sun}) \cdot d\lambda} + \dot{q}_{i,window} \cdot \frac{\int_0^\infty e_{\lambda b}(T_{reactor}) \cdot A_w(\lambda, T_{reactor}) \cdot d\lambda}{\int_0^\infty e_{\lambda b}(T_{reactor}) \cdot d\lambda} \right) \quad \text{Equation 12}$$

$$\dot{q}_{transmitted} = \dot{q}_{i,window} \cdot \frac{\int_0^\infty e_{\lambda b}(T_{reactor}) \cdot T_w(\lambda, T_{reactor}) \cdot d\lambda}{\int_0^\infty e_{\lambda b}(T_{reactor}) \cdot d\lambda} \quad \text{Equation 13}$$

and $e_{\lambda,b}(T_{sun})$ is the Planck's blackbody spectral emissive power at 5780 K, which closely approximates the solar spectrum. The factor 0.5 in Equation (12) takes into account emission from both sides of the window. Aw, Tw and Rw are the overall spectral absorptance, transmittance, and reflectance, respectively, which, for clear fused quartz of high purity, are approximated to be constant in the three spectral bands shown in Table 6. Application of the radiosity method for diffuse enclosures yields the following system of equations for each of the three spectral bands in terms of the net radiative power fluxes q and temperatures T:
Equation 14

$$\sum_{j=1}^{N}\left(\frac{\delta_{kj}}{\varepsilon_j}-F_{k-j}\frac{1-\varepsilon_j}{\varepsilon_j}\right)q_j=\sum_{j=1}^{N}F_{k-j}\sigma(T_k^4-T_j^4)$$

for k,j=1 (window) and 2 (cavity walls). Using the reciprocity relation for the view factor between cavity walls and the window, Fcavity–window=Aaperture/Acavity. Thus, the radiative flux incident on the window qi,window is:
Equation 15

$$\dot{q}_{i,window}=\sigma T_{reactor}^4-\frac{1-\varepsilon_{cavity}}{\varepsilon_{cavity}}\cdot\dot{q}_{cavity}$$

where the net heat flux on the cavity walls $q_{cavity}$ is given by
Equation 16

$$\dot{q}_{cavity}=\frac{\dot{Q}_{conduction}+\dot{Q}_{chem}+\dot{Q}_{heating}}{A_{cavity}}$$

Kinetic rate expressions are employed for computing the reaction extent at $T_{reactor}$ after residence time τ. Assuming plug flow conditions and a first order reaction,
Equation 17

$$X(t)=1-e^{\frac{\ln(1-X_{petcoke})}{\tau}\cdot t}$$

The total molar flow rate of gases η can therefore be written as:
Equation 18

$$\dot{n}(t)=$$

$$\dot{n}_{petcoke}\cdot(\phi_{Ar}+\phi_{H_2O}+X(t))=\dot{n}_{petcoke}\cdot\left(\phi_{Ar}+\phi_{H_2O}+1-e^{\frac{\ln(1-X_{petcoke})}{\tau}\cdot t}\right)$$

Integration with respect to time and further assuming ideal gas law yields:
Equation 19

$$\tau=\frac{p\cdot V}{\dot{n}_{petcoke}\cdot R\cdot T_{reactor}}\cdot\frac{1}{\phi_{Ar}+\phi_{H_2O}+1+\frac{X_{petcoke}}{\ln(1-X_{petcoke})}}$$

This estimate of the residence time, which accounts for volumetric expansion, is used to iteratively find a $X_{petcoke}$–τ combination for a given initial set of parameters. Finally, applying steady state energy conservation, $$\dot{Q}_{solar}-\dot{Q}_{reradiation}-\dot{Q}_{conduction}-\dot{Q}_{heating}-\dot{Q}_{chem}=0 \quad \text{Equation 20}$$

Figure 6:
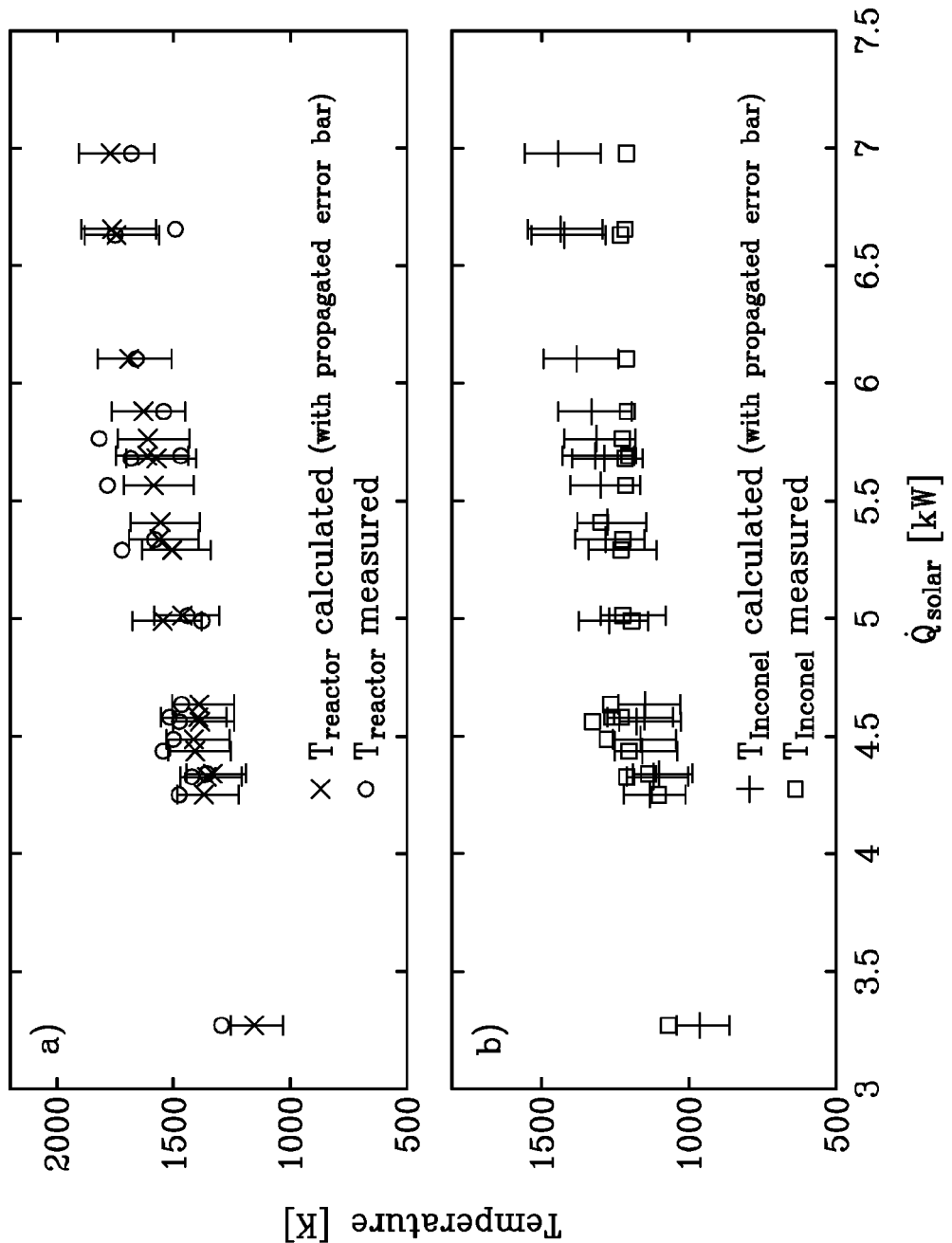
FIG. 6 illustrates temperature of the reactor and Inconel coating as a function of solar power input.
Figure 7:
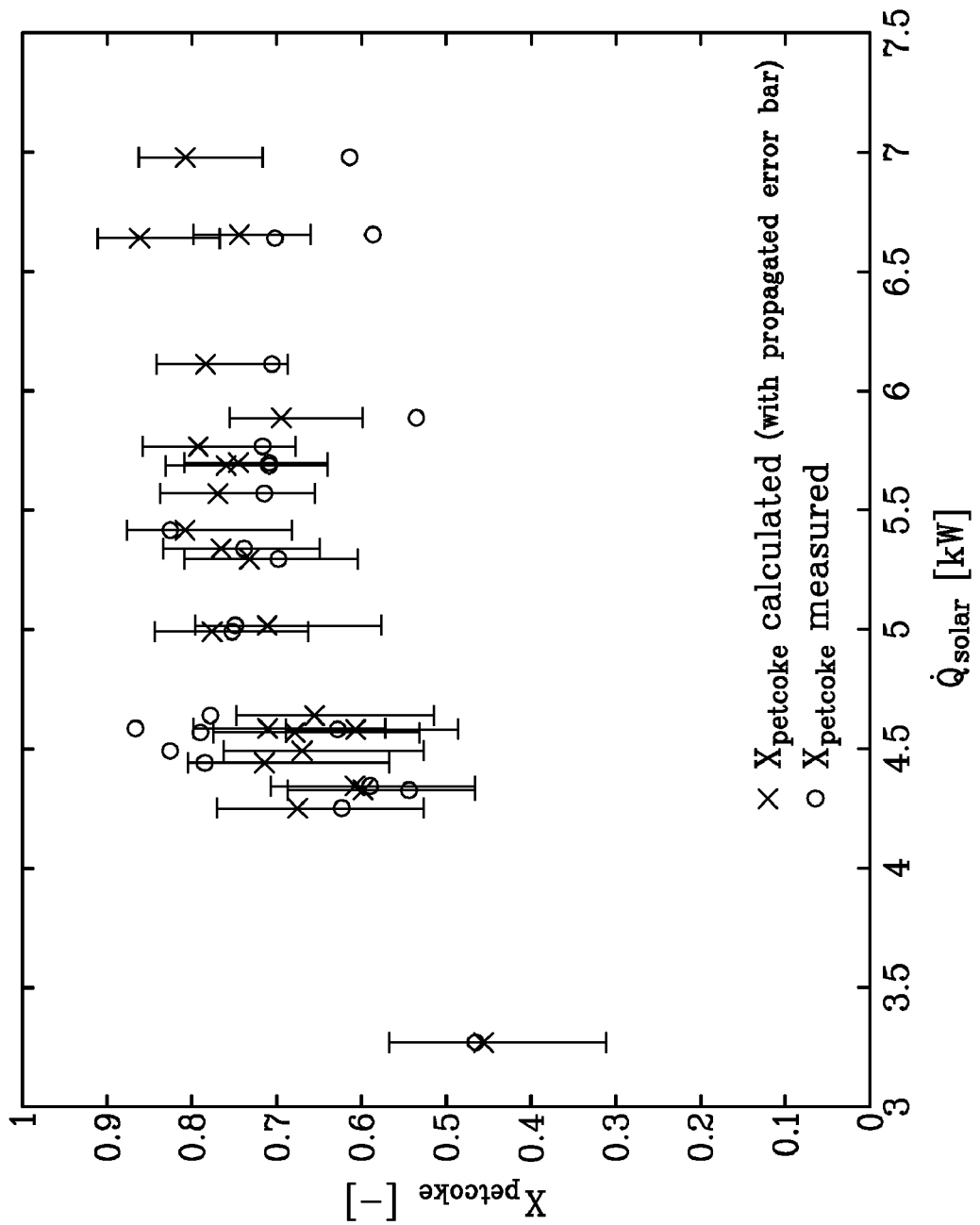
FIG. 7 illustrates calculated and measured petcoke conversion rates as a function of solar power input.
Figure 8:
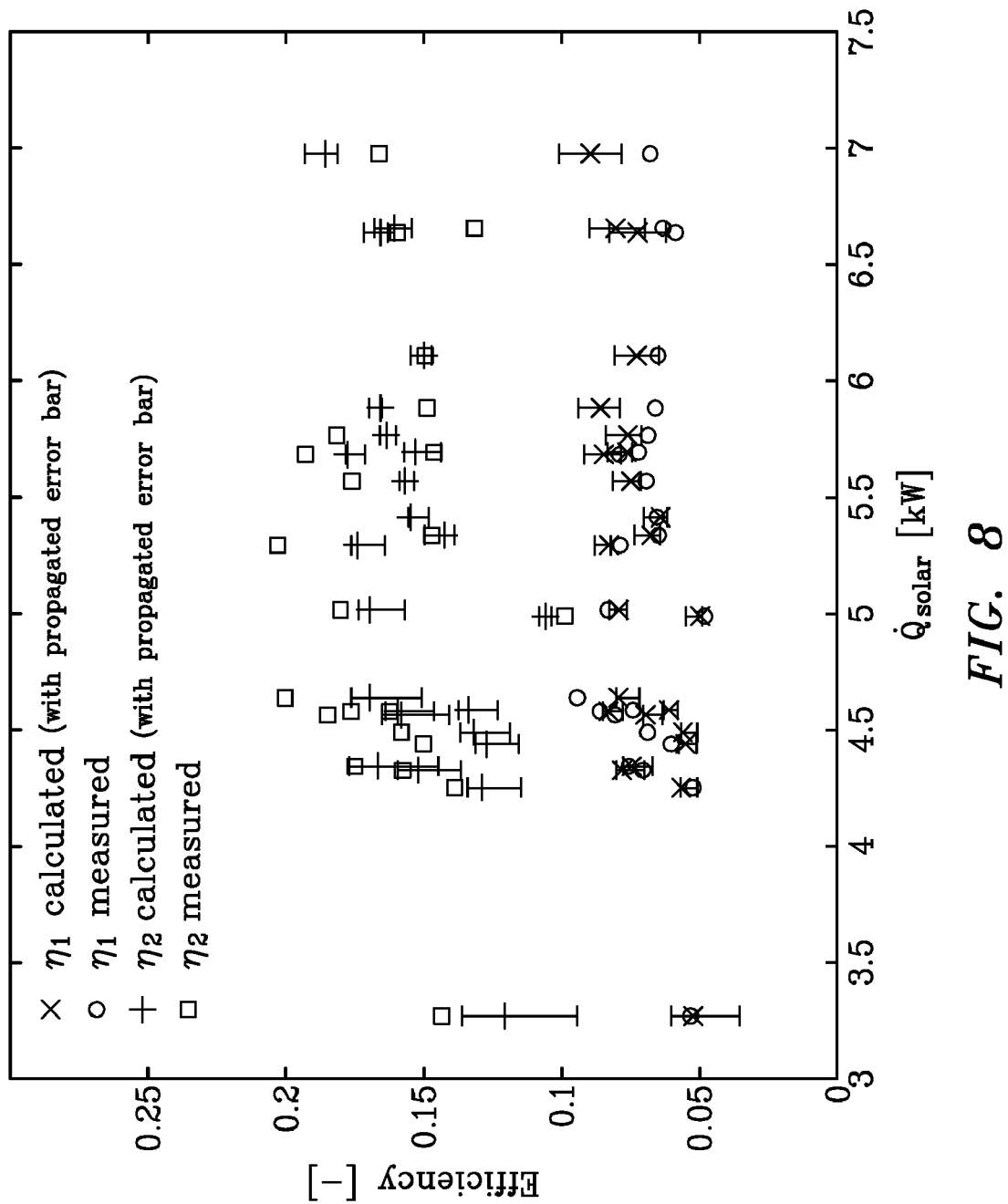
FIG. 8 illustrates process efficiency as a function of solar power input.

Since all terms in Equation (20) are temperature dependent, the problem is solved iteratively until convergence in $T_{reactor}$. The simulation model is run for the operational parameters of each experimental run listed in Table 2. FIGS. 6, 7, and 8 show the experimentally measured and numerically calculated values for reactor temperatures $T_{reactor}$, petcoke conversion $X_{petcoke}$, and energy conversion efficiencies η1 and η2, respectively. The error bars denote the error propagation in the calculated values derived from measurement errors in the solar power input $Q_{solar}$ and the petcoke feeding rate $m_{petcoke}$. The agreement is within the error bars.

The simulation model is further applied for determining optimal design parameters for maximum energy conversion efficiency. For example, a lower petcoke feeding rate leads to a higher chemical conversion due to longer residence times, but at the expense of a lower net solar energy absorbed. In contrast, a higher petcoke feeding rate leads to a larger portion of energy used for heating the feedstock but not converted into chemical energy. A similar effect has an increase in the reactor volume, resulting in longer residence times and higher chemical conversion, but at the expense of higher conduction losses. A sensitivity analysis is performed to elucidate the effect of a given input parameter Z by computing the system derivative Si=dY/dZ, where Y is the output of interest. The selected input parameters are: the solar power input $Q_{solar}$, the petcoke feeding rate mpetcoke, the overall thermal conductivity U, and the $H_2O$-to-petcoke and Ar-to-petcoke molar ratios $\phi_{H_2O}$ and $\phi_{Ar}$. The output terms of interest are: $T_{reactor}$, $X_{petcoke}$, η1, and η2. Results are listed in Table 3

TABLE 3

| Z→ | $\dot{Q}_{solar}$ | $\dot{m}_{petcoke}$ | U | $\phi_{H2O}$ | $\phi_{Ar}$ |
|---|---|---|---|---|---|
| $S_{relative}(T_{reactor})$ | 0.806 | −0.112 | −0.597 | −0.053 | 0.0002 |
| $S_{relative}(X_{petcoke})$ | 1.059 | −0.605 | −0.816 | 0.107 | −0.28 |
| $S_{relative}(\eta_1)$ | 0.059 | 0.395 | −0.817 | 0.107 | −0.28 |
| $S_{relative}(\eta_2)$ | 0.117 | 0.569 | −0.798 | 0.246 | 0.0224 |

In Table 3, $S_{i,relative}$ is the local relative sensitivity defined as $$S_{i,relative}=\frac{\left[Y\left(Z+\frac{\Delta Z}{2}\right)-Y\left(Z-\frac{\Delta Z}{2}\right)\right]/Y}{\Delta Z/Z}$$

with ΔZ/Z=0.025. For Y=$T_{reactor}$, $Q_{solar}$ has the highest impact, followed by U and mpetcoke, while the stoichiometric ratios have a much weaker effect. As expected, $X_{petcoke}$ is mainly influenced by $m_{petcoke}$ and U.

Figure 9:
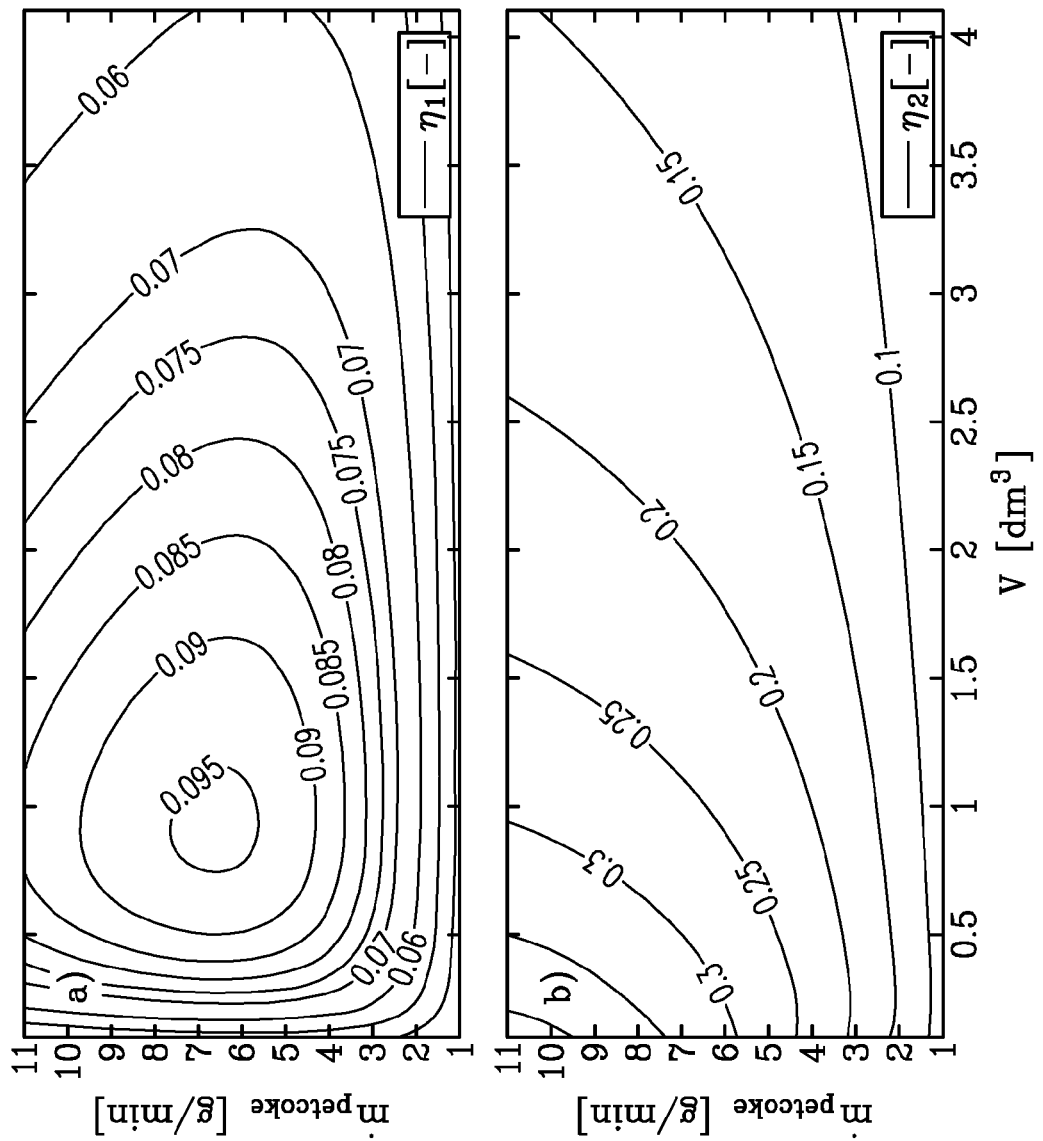
FIG. 9 illustrates molar flow rate curves for different petcoke feed rates and reactor volumes.

For all output variables, $Q_{solar}$, U and, in some cases, $m_{petcoke}$ have the highest influence. FIG. 9 shows a contour plot of the efficiencies η1 and η2 as a function of the reactor volume V and the petcoke feeding rate $m_{petcoke}$, using as baseline the operating conditions of run #7 listed in Table 2. There is an optimum combination of mpetcoke and V for maximum η1: for $m_{petcoke}$=6.5 g/min and V=1.0 dm3, η1,max=9.6% and η2=25.1%.

Figure 10:
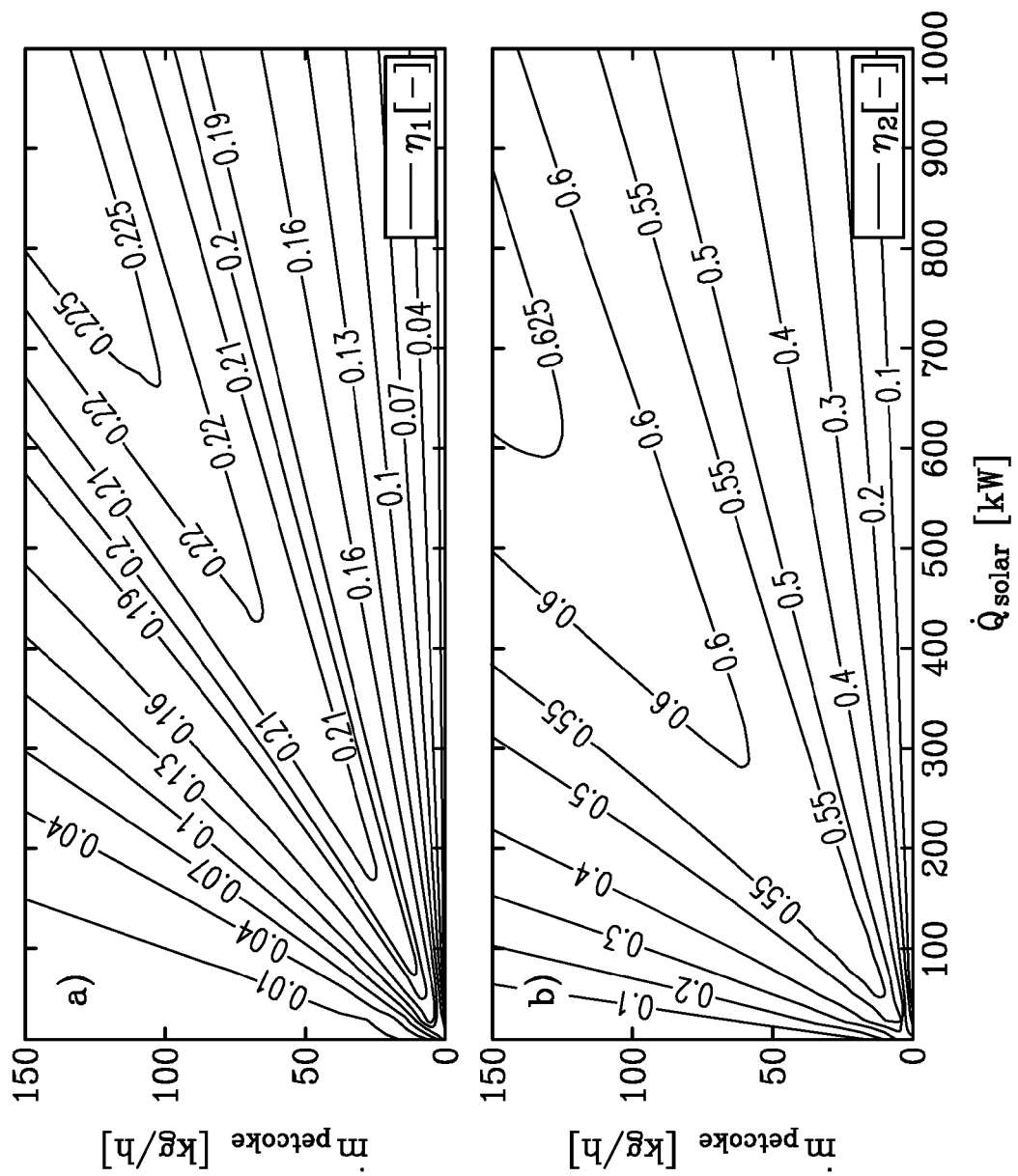
FIG. 10 illustrates molar flow rate curves for different petcoke feed rates and solar power inputs.

The effect of scaling-up the reactor is elucidated in FIG. 10, where η1 and η2 are plotted as a function of $Q_{solar}$ and $m_{petcoke}$, using as baseline the optimum operating conditions found in FIG. 9. The reactor volume is scaled-up linearly with $Q_{solar}$ while the aperture's diameter is adjusted to keep a constant average solar concentration ratio of 2300 suns. Further assumed is an improved 5 cm-thick ceramic insulation. There is a remarkable positive effect of scaling up the reactor as a result of the relative lower conduction losses through a smaller area-to-volume ratio. For example, for an optimum petcoke feeding rate, the predicted η1 of a 10, 100, and 1000 kW reactor is 12%, 21%, and 23%, respectively, whereas the predicted η2 is 35%, 58%, and 63%, respectively.

Tables 4 and 5 below provide Arrhenius parameters for steam-gasification of flexicoke and PD coke, respectively.

TABLE 4

| Reaction constant | Flexicoke | | |
| --- | --- | --- | --- |
| 1070-1370 K | $E_A$ [kJ/mol] | $k_0$ [$k_i$] | RMS [-] |
| $k_1$ [mol/g s Pa)] | 158 | $4.74 \cdot 10^{-3}$ | $4.22 \cdot 10^{-10}$ |
| $k_2$ [mol/(g s Pa)] | 66.5 | $1.02 \cdot 10^{-6}$ | $5.58 \cdot 10^{-10}$ |
| $k_3$ [l/Pa] | −200 | $1.09 \cdot 10^{-12}$ | $5.05 \cdot 10^{-04}$ |

TABLE 5

| Reaction constant | PD Coke | | |
| --- | --- | --- | --- |
| 1070-1670 K | $E_A$ [kJ/mol] | $k_0$ [$k_i$] | RMS [-] |
| $k_1$ [mol/(g s Pa)] | 78.9 | $1.05 \cdot 10^{-6}$ | $3.62 \cdot 10^{-10}$ |
| $k_2$ [mol/(g s Pa)] | 91.5 | $1.94 \cdot 10^{-6}$ | $3.30 \cdot 10^{-10}$ |
| $k_3$ [l/Pa] | −125 | $2.92 \cdot 10^{-9}$ | $1.32 \cdot 10^{-3}$ |

In accordance with the invention, a solar chemical reactor is provided for performing solar steam-gasification of petcoke to syngas. Example data was obtained using a high-flux solar furnace for a solar power input in the range 3.3-6.6 kW, a nominal reactor temperatures in the range 1296-1818 K, and a reactant mass flow rate in the range of 1.85-4.45 gr petcoke/min and 3.68-9.04 gr steam/min. Chemical conversions of petcoke and steam reached up to 87% and 69%, respectively. The energy conversion efficiency, defined as the portion of solar energy net absorbed (both as chemical energy and sensible heat) ranged from 10 to 20%.

The steady state energy conservation equation that links the radiative power input with the power consumed by the endothermic chemical reaction was determined. Validation was accomplished by comparing calculated and measured values for temperatures, chemical conversions, and energy conversion efficiencies. Example results predict a solar-to-chemical energy conversion efficiency of 63% and a petcoke gasification rate of 76 kg/h for a solar power input of 1 MW to a scaled-up reactor.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for converting solid carbonaceous materials into fluid fuels using an external source of concentrated radiation, comprising the steps of:
    providing a reactor comprising a wall defining a cavity; a radiation inlet through the wall for passing concentrated radiation into the cavity; and at least one inlet for introducing a fluid reactant flow of a source of oxygen and particles of carbonaceous material into direct exposure to the concentrated radiation in the cavity so as to heat and thermochemically convert the particles into fluid fuel;
    introducing concentrated radiation through the radiation inlet into the cavity; and
    introducing the reactant flow through the at least one inlet and into the cavity in the presence of the concentrated radiation so as to heat and thermodynamically convert the particles into fluid fuels.

2. The process of claim 1, wherein the reactor has a radiation inlet chamber having a window through which radiation enters the chamber, and further comprising the step of introducing a gas into the chamber so as to form an aerodynamic curtain between the reactor and the window whereby the window is kept clean and cooled during operation.

3. The process of claim 1, wherein the introducing step comprises feeding the reactant flow to the reactor as a slurry.

4. The process of claim 1, wherein the process is a continuous process generating a continuous stream of products exiting the cavity.

5. The process of claim 1, wherein the radiation inlet chamber comprises a transparent window, and further comprising the step of maintaining the transparent window at a temperature which is above the condensation temperature of steam.

6. The process of claim 1, wherein the at least one inlet is positioned so that the introducing steps result in a continuous vortex flow of fluid with entrained particles of the carbonaceous material within the cavity and exposed to the concentrated radiation.

7. The process of claim 1, wherein the introducing steps produce a product stream which is a substantially equimolar mixture of hydrogen and carbon monoxide, with less than about 5% volume of carbon dioxide.

8. The process of claim 1, wherein the carbonaceous solid comprises particles of petcoke.

9. The process of claim 1, wherein the particles have an average diameter of less than 100 microns.

10. The process of claim 1, wherein concentrated radiation is introduced through the radiation inlet at a power input sufficient to raise the temperature of the reactants to greater than about 1300 K and to drive a desired gasification reaction.

11. The process of claim 1, wherein the cavity is maintained at a reaction temperature of between about 1300 and about 1800 K.

* * * * *

UNITED STATES PATENT AND TRADEMARK OFFICE
CERTIFICATE OF CORRECTION

| | | |
|---|---|---|
| PATENT NO. | : 8,257,454 B1 | Page 1 of 1 |
| APPLICATION NO. | : 12/017426 | |
| DATED | : September 4, 2012 | |
| INVENTOR(S) | : Philipp Haueter et al. | |

It is certified that error appears in the above-identified patent and that said Letters Patent is hereby corrected as shown below:

On The Title Page, Item (73) the Assignees should be listed as follows:

Intevep, S.A. (VE);

Ciemat (Centro De Investigaciones Energeticas Medioambientales Y Tecnologicas) (ES);

ETHZ (Swiss Federal Institute of Technology) (CH)

Signed and Sealed this
Twenty-first Day of July, 2015

Michelle K. Lee
*Director of the United States Patent and Trademark Office*